Dec. 1, 1942.  F. PORTER  2,303,658
METHOD OF COATING PHENOL REACTORS AND THE LIKE
Filed June 23, 1941
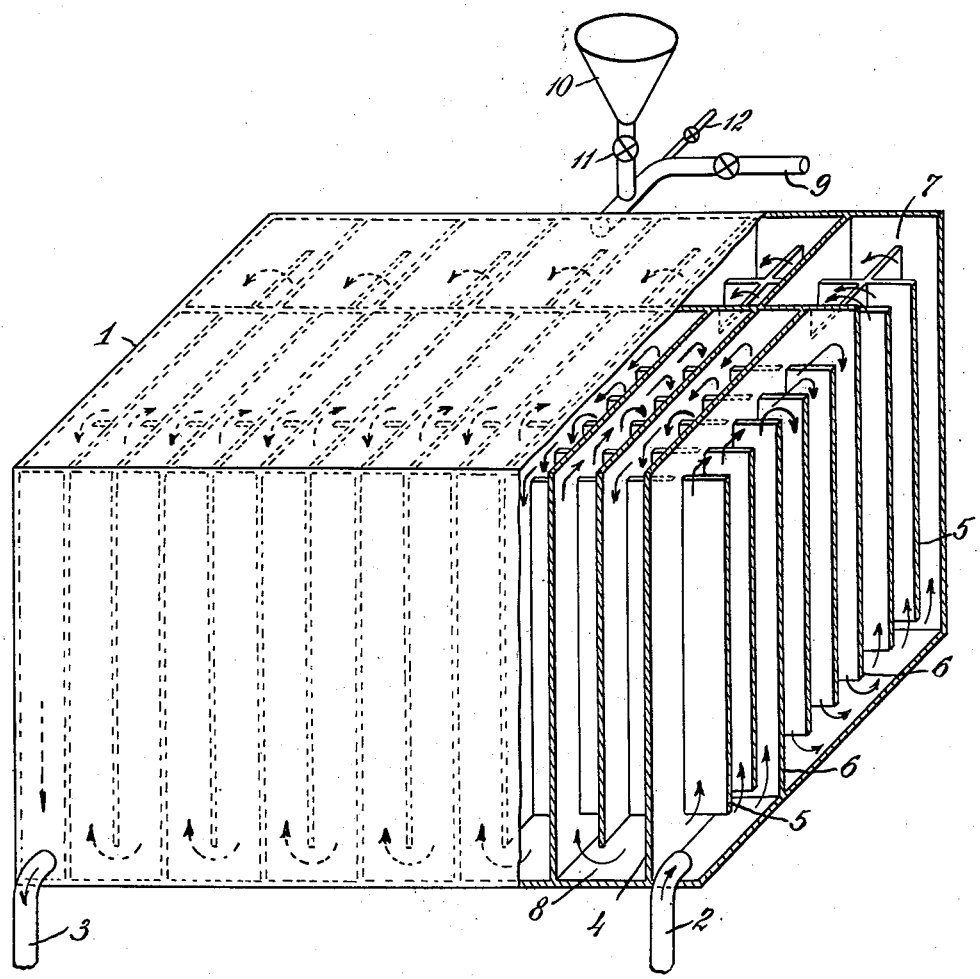
INVENTOR
FRANK PORTER
BY
ATTORNEY Patented Dec. 1, 1942

2,303,658

UNITED STATES PATENT OFFICE 2,303,658

METHOD OF COATING PHENOL REACTORS AND THE LIKE

Frank Porter, Syracuse, N. Y., assignor to The Solvay Process Company, New York, N. Y., a corporation of New York Application June 23, 1941, Serial No. 399,412

10 Claims. (Cl. 117—106)

This invention relates to vapor phase catalytic oxidation processes and is particularly concerned with the provision of boron oxide coatings upon reactor surfaces for use in such processes.

In the manufacture of phenol from benzene and cresols from toluene, it has been proposed to provide a reactor the surfaces of which are coated with fused boron oxide to provide a smooth surface having a minimum destructive effect upon the phenol or cresols produced.

The preparation of an apparatus coated in the above manner has been effected by distributing boron oxide over the surfaces, or applying a paste of boron oxide or boric acid to the surfaces, during construction or assembly of the apparatus and subsequently heating the apparatus to a temperature above the fusion point of boron oxide. Since boric acid decomposes below the fusion point of boric oxide, the process in either case effects a fusion of boron oxide upon the reactor surfaces and thus coats the surfaces with fused boron oxide. It has been found, however, that in reactors constructed of porous material such as fire-brick, the boron oxide gradually migrates from the surface of the material toward the interior thereof and consequently, even though sufficient boric oxide has been applied to provide a relatively thick coating in the beginning, the surfaces eventually may become starved, lose their vitreous appearance, and subject the phenol being formed to the destructive action of the uncoated surfaces. It is possible to dismantle the apparatus and rebuild it with application of additional boron oxide in the same manner as employed in its original construction, but this is a laborious and time-consuming procedure since in most cases the reactor is a rather complicated structure requiring careful bricklaying to provide uniform channels of the desired arrangement.

The present invention has for its object the provision of boron oxide coatings in the reactor after the reactor is assembled and without the necessity for dismantling and reconstructing the apparatus.

According to this invention, the reactor to be coated with boron oxide is treated with a gas containing a suspension of boron oxide or a compound of boron convertible to boron oxide under the conditions of distribution.

Several effective methods of applying the invention are available. Thus, solid boron oxide in the form of dust may be blown into the reactor, which preferably is maintained at a temperature above the fusion point of the boron oxide, at least in that portion of the reactor where the greatest concentration of boron oxide is desired. Instead of employing boron oxide, a dust, mist, or vapor of a borate may be passed into the reactor maintained at such a temperature that the borate is decomposed to boron oxide upon contacting with the hot reactor surface. When a suspension or dust of boron oxide is employed, it may be prepared by dusting solid powdered boron oxide into the gas or by decomposing boric acid or a borate previously distributed in the gas. Boron oxide at temperatures from about 577° up to 800° C. or more is a viscous liquid which adheres readily to the walls with which it is contacted and hence, whether the boron oxide is present in the gas as a dust and is merely fused by contact with the hot walls of the reactor, or whether a boron compound is decomposed to form the boron oxide which is then fused in contact with the walls, an effective coating of surfaces within the reactor is obtained. An especially effective method of application involves passing a hot gas containing a mist of molten boron oxide into the reactor.

It has been found that the present coating method is effective for providing coatings on highly complex reactors consisting of tortuous passages in which it might be expected that the dust or mist of boron compound would precipitate entirely in the early part of the reactor. Moreover, by suitable regulation of the velocity of the boron compound suspension through the reactor, practically any desired distribution of the compound on the reactor surfaces may be obtained. In practice, for example, it has been possible not only to effectively coat a reactor comprising a number of tortuous passages more than 40 feet in length but it has been possible in the same operation to effectively coat the packing of a regenerator connected to the end of the reactor, and even to pass a portion of the boron compound suspension through the entire system. Thus, by lowering the velocity of the gas passing into the reactor, the boron compound may be distributed nearer to the inlet and by raising the velocity of the gas the boron compound may be distributed at points farther and farther along the reactor. A suitable velocity may be established by increasing the velocity until boron compound is observed in the exit gas and then diminishing the velocity slightly below this value.

Examples of boron compounds thermally decomposable to form boron oxide are boric acid and the alkyl borates and acid borates such as trimethyl borate, triethyl borate, tripropyl borate, tri-isobutyl borate, tri-isoamyl borate, and monoethyl borate (ethyl boric acid).

Boron compounds such as trimethyl boron and triethyl boron are readily oxidized by air at high temperatures and may be used in the presence of sufficient molecular oxygen to convert their boron content to the oxide.

When compounds such as those enumerated are employed with hot gases containing oxygen, the conversion of the boron compound to boron oxide may take place before the mixture enters the reactor, in which case the boron oxide deposition proceeds just as if boron oxide of corresponding particle size had been employed. Whether the conversion to boron oxide takes place ahead of the reactor or within it, however, a satisfactory coating may be obtained.

The attached drawing illustrates in general a type of apparatus to which the invention is applicable and shows one method of introducing the boron oxide into the apparatus in order to effectively coat the surfaces thereof. The reactor designated by the numeral 1 is connected at opposite ends with conduits 2 and 3 for introducing and withdrawing reaction mixture into and from the reactor.

The reactor 1 comprises a labyrinthine chamber divided by partitions into tiers, each of which is further divided into a series of groups of parallel passages so arranged that gases from the parallel passages of each group intermingle before passing into the passages of the next succeeding group.

In the drawing the exterior walls of the reactor have been removed from the first few tiers to show the internal construction more clearly. Thus, it may be seen that the first tier into which conduit 2 leads comprises a partition 4, which is common to the first and second tiers, and a plurality of parallel short cross-partitions 5 and long cross-partitions 6. Each pair of partitions 5 is separated from the next pair by one of the long partitions 6, and each of the long partitions 6 is staggered with respect to the next. This arrangement provides for flow of three parallel streams of gas up in front of the near partition 6 to the top, where the three streams are mixed and redivided, down between it and the far partition 6 to the bottom, where the streams are mixed again and divided anew, and up again behind the far partition 6. On the far side of the far partition 6, partition 4 is cut away at 7 to permit passage of gas into the second tier of the reactor. The gas passes as a group of parallel streams through a series of groups of parallel passages in the second tier, alternately down, up, down, and finally out at 8 to the next tier, and so on through the apparatus, with mixing of the gas streams at each change of direction.

While the design of reactors for oxidations of the type under consideration obviously is not confined to the particular arrangement illustrated, it is desirable to employ an apparatus of similar character; that is, apparatus comprising one or more parallel passages connected with one or more additional parallel passages by intermediate mixing zones, provided suitably, for example, by a change of direction of flow, and to employ sufficient of such mixing zones to insure adequate mixing of reaction gases during the conduct of the process. Consequently, whether the illustrated design or an equivalent one is employed, a highly complex interior structure is involved. However, the present invention is applicable not only to such complex structures, but to more simple arrangements such as reactors or regenerators packed with checkerwork or randomly disposed refractory material.

Regenerators of the type under consideration may be constructed of any suitable material. Various types of firebrick have been found suitable. The porosities of different types of bricks differ and accordingly the quantity of boron oxide to be employed and the frequency of applications will depend upon the type of brick employed. However, the same general procedure or treatment may be used regardless of the type of brick or other material employed as the support.

The reactor 1 may be provided with a centrally disposed inlet conduit 9 for supplying combustion gas to the reactor in order to reheat the reactor to reaction temperature. This conduit may be provided with a feed hopper 10 having a valve 11 for regulating feed into conduit 9. A compressed air inlet 12 or any other jet device may be provided on conduit 9 for agitating solid material fed in by hopper 10 and dispersing it in the gas passing through conduit 9.

The apparatus may be heated by directing combustion gas entering through conduit 9 first through outlet conduit 2 and then through outlet conduit 3. During the later portion of the heating-up period, for example, after the temperature of the reactor has been raised to about 650° C. at the center, powdered boron oxide or boric acid may be introduced through hopper 10 and distributed in the hot combustion gas by a high velocity jet of air entering at 12. If boric acid is employed, it is rapidly decomposed by the hot gas, which may be at a temperature of 700°–800° C. or higher, to form boron oxide, and the mist of molten boron oxide passes through the channels of the reactor until it strikes the walls thereof and adheres thereto.

As an alternative method of introducing the boric oxide, powdered boric acid may be fed continuously into the stream of primary air entering the burner so that the resulting boric oxide is partly vaporized as it passes through the gas flame. On being cooled by the excess secondary air to about 700° C. to 800° C., the vaporized boric oxide condenses to very fine liquid droplets which remain suspended in the combustion gases sufficiently to coat surfaces at relatively remote distances from the burner.

As another alternative method of introducing the boron oxide, a volatile compound such as methyl borate, may be added to the relatively cool mixture entering the reactor during normal operation thereof. The borate will be heated by contact with the hot walls of the reactor and thereby decomposed to form boron oxide which melts and deposits upon the walls of the reactor. While by this method of treatment a relatively small proportion of the boron oxide will be precipitated toward the inlet end of the reactor, the direction of flow may be periodically reversed so that a highly uniform coating may be obtained.

The following examples further illustrate the invention.

Example 1

A reactor comprising 8 to 10 mesh fire-brick fragment packing, which had been coated with boron oxide during its construction, was employed for the manufacture of phenol by the vapor phase air oxidation of benzene. When the reactor was new, the ratio of gaseous byproducts to phenol produced was about 0.8. Over a period of operation of about two weeks, however, this ratio gradually increased until it reached a value of about 1.4. Without stopping the oxidation process, which was of the regenerative type involving periodic reversal of flow through the reactor, about 0.1 mol per cent of methyl borate $(CH_3)_3BO_3$ was introduced into the gas mixture entering the converter for a period of about 1.2 hours. By the end of this period the ratio of by-product gases to phenol had dropped to about 0.7.

Example 2

A multiple-passage reactor of the type illustrated in the drawing, composed of a commercial fire-brick ("Special Texture Duro"), was examined after a considerable period of operation in the production of phenol from benzene, and it was found that the brick was dry and dull in appearance and showed little or no glaze of boron oxide on its surface. This was particularly true of the undersides of the bricks forming shelves of the apparatus and to a very considerable extent for the vertical surfaces of the bricks. The reaction zone was reassembled and brought to a temperature of about 750° C. maximum, that is, in the zone of highest temperature, by passing combustion gas from gas burners into the reactor. Part of the combustion gas was introduced at the middle and part at one end of the reactor; all was withdrawn at the other end. Sufficient excess secondary air was supplied to the gas burner to provide a combustion gas mixture at a temperature lying between 700° and 800° C. After the reactor temperature maximum had been raised as aforesaid, a small amount of powdered boric acid was blown continually into the flames of the gas burners and into the secondary air streams by means of a small flow of compressed air. The resulting smoke of molten boron oxide in combustion gas was passed through the reactor during a period of about 6 hours, a major proportion being introduced at the end of the reaction zone and a minor proportion at the middle. At the end of this 6-hour period, the maximum reactor temperature was about 750° C. The effectiveness of the coating of boron oxide obtained was indicated by the percentage conversion of benzene to phenol obtained before and after the treatment. Thus, prior to the treatment a conversion efficiency of about 39 pounds of phenol per 100 pounds of benzene attacked was obtained whereas when oxidation was resumed after the treatment, a conversion efficiency of approximately 53 pounds of phenol per 100 pounds benzene attacked was obtained.

Example 3

In a small fire-brick reactor of the general type used in Example 2 and containing about 2000 pounds of split fire-brick to which about 20% by weight of boric acid had been added during construction, based on the weight of the brick, the oxidation of benzene to phenol was conducted by a regenerative process involving reversing flow until a lowered conversion efficiency indicated that the boron oxide coating had been absorbed into the brick. This was confirmed by an examination of the brick, which exhibited a relatively dull surface. During subsequent operations boric acid was added as a dust in the stream of reaction mixture introduced into the converter whenever the conversion efficiency began to fall off. The boric acid was added in lots of about 3 pounds; about 2 minutes were required to add each lot. During around 150 hours of operation approximately 120 pounds of boric acid were added in small increments at spaced time intervals. The boron oxide was being added during about 1% of the operating time. In this way the conversion efficiency of the reactor was maintained at a high value.

It should be appreciated that in continuing operations such as described in Example 3 above, the pores of the fire-brick gradually become saturated with boron oxide and eventually a point is reached where practically no additional boron oxide need be added or where additions are required at very infrequent intervals. The period illustrated by Example 3 is the period of saturation during which the boron oxide continues to migrate from the surface of the bricks toward the inner portions thereof.

With some types of reactors, especially those employing highly porous foundation material for the boron oxide, the boron oxide may tend to drain to and accumulate in the lower portion of the reactor. In this instance the reactor may be provided with a sump for collecting the molten boron oxide which may be withdrawn and redistributed upon the reactor surfaces either immediately or after cooling and grinding.

I claim:

1. The method of coating solid surfaces with fused boron oxide, which comprises passing a gas containing a boron compound of the group consisting of boron oxide and a boron compound thermally decomposable to boron oxide distributed therein into contact with the solid surfaces while said surfaces are maintained at a temperature above the melting point of boron oxide.

2. The method of coating the surfaces of a reactor with fused boron oxide, which comprises passing a gas containing a mist of boron oxide suspended therein through said reactor at a temperature above the melting point of boron oxide and regulating the flow so that at least a part of the boron oxide precipitates upon the surfaces of the reactor.

3. The method of coating the surfaces of a reactor with fused boron oxide, which comprises passing a gaseous mixture containing boric acid distributed therein through said reactor while said reactor is maintained at a temperature above the melting point of boron oxide thereby converting said boric acid to liquid boron oxide and precipitating the liquid boron oxide upon said surfaces.

4. The method of coating the surfaces of a reactor with fused boron oxide, which comprises passing a gas containing a volatile borate thermally decomposable to boron oxide into contact with the reactor surfaces maintained at a temperature sufficient to convert the volatile borate to molten boron oxide.

5. The method of coating the surfaces of a phenol reactor with fused boron oxide, which comprises blowing a dust of boric acid into hot combustion gas at a temperature above the melting point of boron oxide, passing the resulting mist of molten boron oxide through the reactor, and regulating the flow thereof so that at least a part of the molten boron oxide precipitates upon the surfaces of the reactor.

6. In the manufacture of a phenol by the vapor phase oxidation of a hydrocarbon of the group consisting of benzene and toluene in a boron oxide coated reactor, the method of renewing the boron oxide coating of the reactor during vapor phase oxidation operations which comprises introducing a volatile borate thermally decomposable to boron oxide into the reaction mixture entering the reactor while the reactor is maintained at a temperature sufficient to convert the volatile borate to molten boron oxide whereby molten boron oxide is deposited upon the reactor surfaces.

7. In the manufacture of phenol by vapor phase oxidation of benzene in a boron oxide coated reactor, the method of renewing the boron oxide coating in the reactor during oxidation operations, which method comprises introducing a small proportion of vapor of an alkyl borate into the reaction mixture passing into the reactor while the maximum temperature of the reactor lies between the melting point of boron oxide and about 800° C. whereby the alkyl borate is thermally decomposed to form molten boron oxide and the molten boron oxide is deposited upon the hot reactor surfaces.

8. The method of coating the surfaces of a phenol reactor with fused boron oxide, which comprises feeding powdered boric acid into the combustion zone of a gas burner adapted to supply hot combustion gas to the reactor, whereby the boric acid is decomposed and partly converted to boron oxide vapor, adding air to the hot gas mixture containing boron oxide vapor to form a gas mixture at a temperature above the melting point of boron oxide but not substantially above 800° C. and thus to condense boron oxide vapor and form a mist of molten boron oxide in the hot gas mixture, passing the hot gas mixture containing the mist of molten boron oxide through the reactor, and regulating the flow thereof so that at least a part of the molten boron oxide precipitates upon the surfaces of the reactor.

9. The method of coating the surfaces of a phenol reactor with fused boron oxide, which comprises feeding powdered boric acid into the combustion zone of a gas burner adapted to supply hot combustion gas to the reactor whereby the boric acid is decomposed and partly converted to boron oxide vapor, supplying excess secondary air containing a dust of boric acid to said combustion zone to form a combustion gas mixture at a temperature above the melting point of boron oxide but not substantially above 800° C. and thus to condense boron oxide vapor and form a mist of molten boron oxide in the hot gas mixture, passing the hot gas mixture containing the mist of molten boron oxide through the reactor, and regulating the flow thereof so that at least a part of the molten boron oxide precipitates upon the surfaces of the reactor.

10. In the manufacture of a phenol by the vapor phase oxidation of a hydrocarbon of the group consisting of benzene and toluene in a boron oxide coated reactor, the method of renewing the boron oxide coating of the reactor during vapor phase oxidation operations which comprises introducing methyl borate into the reaction mixture entering the reactor while the reactor is maintained at a temperature above the melting point of boron oxide whereby said methyl borate is thermally decomposed to form boron oxide and molten boron oxide is deposited upon the reactor surfaces.

FRANK PORTER.